US012109443B2

(12) United States Patent
Morgan et al.

(10) Patent No.: US 12,109,443 B2
(45) Date of Patent: Oct. 8, 2024

(54) FIRE EXTINGUISHING ASSEMBLY

(71) Applicant: Black Card Emergency Solutions, LLC, Loveland, CO (US)

(72) Inventors: Peter D. Morgan, Loveland, CO (US); Darrel L. Bothwell, Wellington, CO (US)

(73) Assignee: Black Card Emergency Solutions, LLC, Loveland, CO (US)

( * ) Notice: Subject to any disclaimer, the term of this patent is extended or adjusted under 35 U.S.C. 154(b) by 13 days.

(21) Appl. No.: 17/585,956

(22) Filed: Jan. 27, 2022

(65) Prior Publication Data

US 2023/0233891 A1 Jul. 27, 2023

(51) Int. Cl.
*A62C 37/40* (2006.01)
*A62C 3/06* (2006.01)

(52) U.S. Cl.
CPC .............. *A62C 3/065* (2013.01); *A62C 37/40* (2013.01)

(58) Field of Classification Search
CPC ................................ A62C 3/065; A62C 37/40
USPC ............................................................ 169/46
See application file for complete search history.

(56) References Cited

U.S. PATENT DOCUMENTS 2,561,043 A * 7/1951 Ayers ...................... B02C 23/04 241/245
2,783,845 A * 3/1957 Mathisen ............ F16K 17/0446 241/31
3,653,443 A * 4/1972 Dockery ................ F24C 15/20 169/65
3,866,687 A * 2/1975 Banner ................ A62C 35/605 169/65
3,912,015 A * 10/1975 Garbee ..................... F23K 1/00 241/31
2018/0209641 A1* 7/2018 Garossino ............... F23C 7/008

* cited by examiner

*Primary Examiner* — Chee-Chong Lee
(74) *Attorney, Agent, or Firm* — James B. Conte; Craig R. Miles; CR MILES P.C.

(57) ABSTRACT

An oil, water, and gas separator assembly connects a fire extinguishing assembly. When the extinguisher assembly is in operation, sensors indicate an indication to a processor system. If the indication, after processing by the processor system, indicates an unwanted fire condition, the processor actuates the movement of fire extinguishing agent or suppressant from a source of supply to and through a distribution network and into the various hollows delimited by the separator assembly and to the external environment.

14 Claims, 8 Drawing Sheets

FIRE EXTINGUISHING ASSEMBLY

FIELD OF THE INVENTION

The present disclosure concerns an oil, water, and gas separator assembly having a firetube in a vessel. A fire extinguishing system connects to the separator assembly.

BACKGROUND OF THE INVENTION

The oil and gas exploration and production industry uses a wide variety of methods, machines, and equipment to accomplish its goal of extracting crude oil and natural gas from below the earth's surface. The industry often uses water mixed with a variety of substances to form a well. It uses gas, such as methane to lift the oil in the well. The oil as it comes out of the well contains water used to form the well. It also contains the gas used to lift the oil. It further can contain underground gas and water naturally present. The fluid after coming out of the ground, which can have oil, water, and gas, can be called production fluid.

A production fluid line directs production fluid in the line, which previously exited the well, to an oil, water, and gas separator assembly (50) having a firetube (52). See FIG. 1. The production fluid, as it passes through the separator assembly separates into three fluids, a first fluid having a higher ratio of water to oil compared to the production fluid, the first fluid is water; a second fluid having a higher ratio of oil to water compared to the production fluid, the second fluid is oil; and a third fluid having a higher ratio combustible gas to water, as compared to the production fluid. The fluid is combustible gas. The combustible gas generally consisting mostly of methane.

The separator assembly (50) to separate the fluid includes a vessel (54). The vessel includes an internal surface which delimits an internal hollow (56) of the vessel. The firetube (52) extends into the hollow (56) from an exterior of the vessel. The firetube extends out of the hollow and has an end portions exterior to the vessel (54). A gas flame in the firetube coming off a burner in the firetube heats the tube made of metal. The heated tube conducts heat to the substance in the hollow. The substance includes production fluid passed into the hollow through an opening which opens into the hollow. The production fluid heated by the heated tube separates into the first fluid, called water, and the second fluid, called oil. The heat conducted to the production fluid aids in the separation. The heat also aids in the separation of the third fluid, called gas, and in this particular case flash gas, from the production fluid in the hollow (56). The gas resides in a void space above a liquid layer in the hollow. The liquid layer comprises a first layer and a second layer. The first layer includes the separated oil, the second layer includes the separated water. The first layer resides on top of the second layer. As the oil from the oil layer rises in a direction along a first axis of the vessel having the firetube, it reaches a certain height. The first axis can be perpendicular to a longitudinal second axis of the vessel. A first length of the vessel extends along and in the direction of the longitudinal second axis. A second length of the vessel extends along and in the direction of length of the first axis. The first length is longer than the second length. The second length is a height of the vessel. Oil which reaches the height becomes oriented to reside in fluid connection with an oil storage area of a storage vessel (58). The oil residing in fluid connection with the oil storage area travels into the oil storage area in a storage box. A water supply line carries water from the second layer to a water storage area of the storage vessel (58).

In addition to having a vessel (54) with a firetube (52), the separator assembly can have a gas separation vessel (60), exclusive of the firetube (52). The production fluid, prior to entering the vessel (54) and separating into oil and water as described above, can enter the gas separation vessel (60) from a coil. The coil extends in the vessel having the firetube. The production fluid can flow through the coil and enter the gas separation vessel (60). If the production fluid has sufficient heat, it can enter the gas vessel without passing through the coil. Once the production fluid enters the gas vessel, combustible gas separates out from the production fluid. The gas exits the gas vessel through a sales line (62). Production fluid can flow from the gas vessel into the hollow (56) of vessel (54) having the firetube (52). The production fluid is then separated into oil and water as indicated above. Further gas can be released from the vessel having the firetube as described above. This gas is often called flash gas.

The gas vessel has a longitudinal axis perpendicular to the longitudinal second axis of the firetube vessel. The firetube vessel could be oriented to have its longitudinal second axis to be parallel to the longitudinal axis of the gas vessel.

SUMMARY OF THE INVENTION

In one example of the invention an oil, water, and gas separator assembly connects to a fire extinguishing assembly. The combined assembly includes a vessel having an interior surface delimiting an open area. A firetube is in the vessel open area. A first fire extinguishing agent supply line is in fire extinguishing agent receiving relationship to a fire extinguishing agent source of supply. The first fire extinguishing agent supply line has a fire extinguishing agent exhaust orifice. The first fire extinguishing agent exhaust orifice is disposed in a first hollow area delimited by the firetube. A first sensor is operatively coupled to the firetube to detect an unwanted fire condition in the firetube. A processor system is operatively coupled to the first sensor and configured to process an indication from the first sensor. If the indication, after processing by the processor system, indicates an unwanted fire condition, the processor system actuates the movement of fire extinguishing agent at said source of supply into the first fire extinguishing agent supply line and through the fire extinguishing agent exhaust orifice.

Yet a further example of the invention includes a method of extinguishing an unwanted fire in an oil, water, and gas separator assembly. The method includes indicating an indication to a processor system; processing the indication with the processor system; indicating from the processor system, responsive to said processing, an indication to actuate movement of fire extinguishing agent from a fire extinguishing agent source of supply; moving the fire extinguishing agent, responsive to the actuation, from the supply source into a supply line. The supply line extends into an exhaust of the separator assembly; and the supply line opens at a hollow area of a firetube of said separator assembly. The method further includes passing the fire extinguishing agent through an exhaust orifice of the supply line and into the hollow area of the firetube.

Naturally, further objects and constructions of the invention are disclosed throughout other areas of the specification, drawings, and claims.

DETAILED DESCRIPTION OF THE INVENTION

Figure 1:
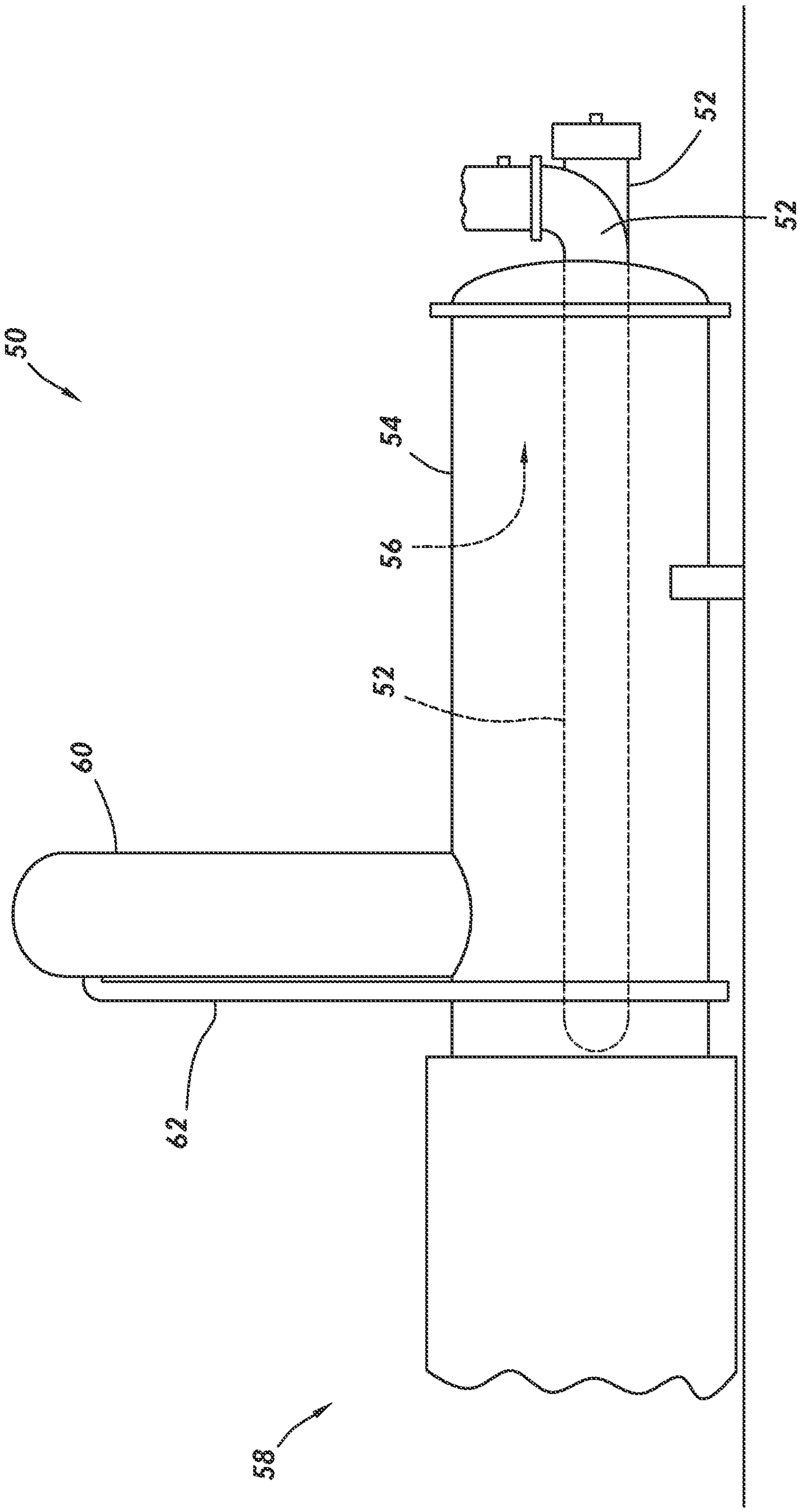
FIG. 1 (PRIOR ART)
FIG. 1 is a stripped down schematic of an example of an oil, water, and gas separator known in the prior art.
Figure 2:
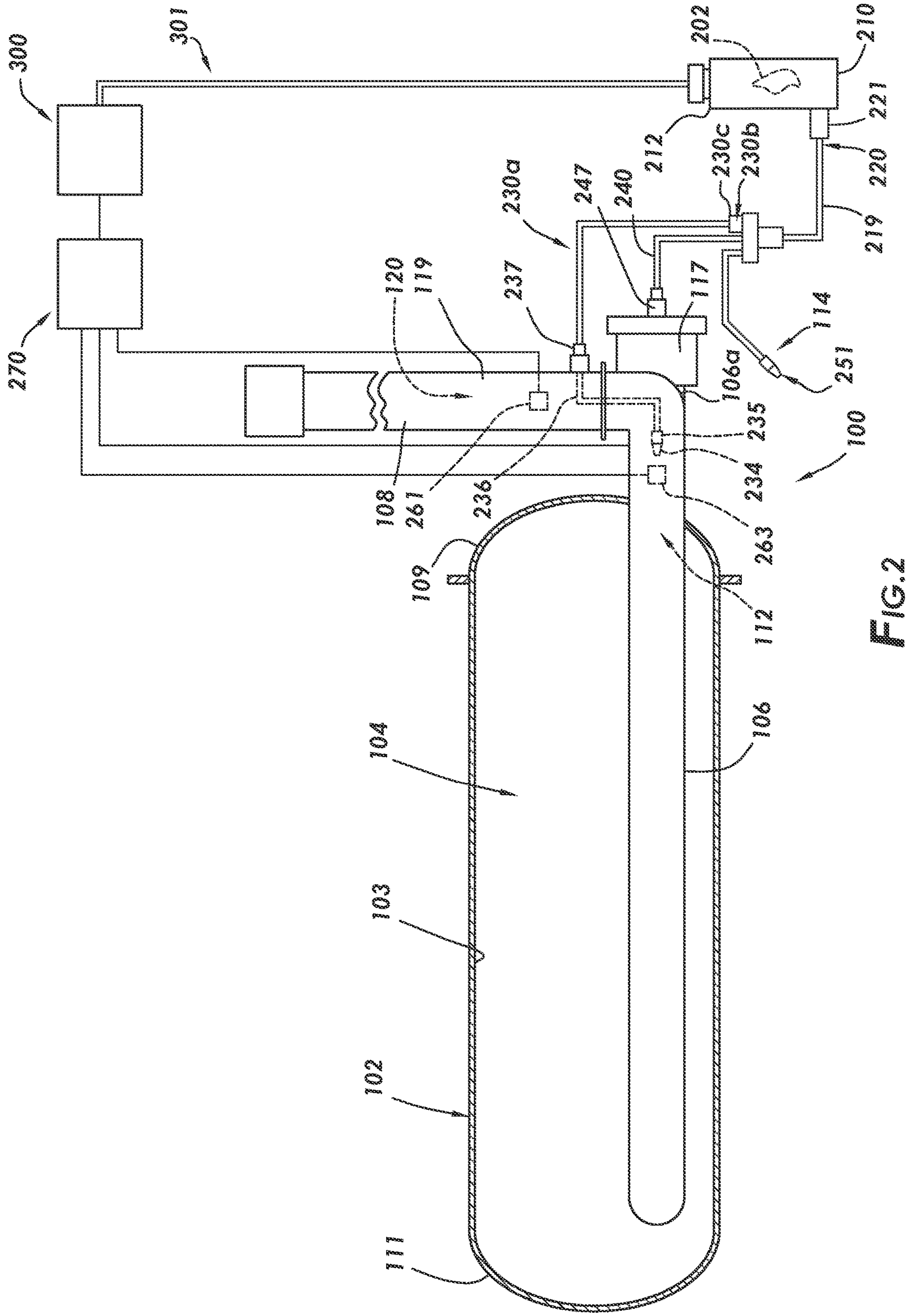
FIG. 2 is a stripped down schematic sideview of an oil, water and gas separator assembly connected to a fire extinguisher assembly; the combination intentionally omits the vertical gas separator and oil/water storage vessel for ease of understanding; the assemblies embodying features of the present invention.
Figure 3:
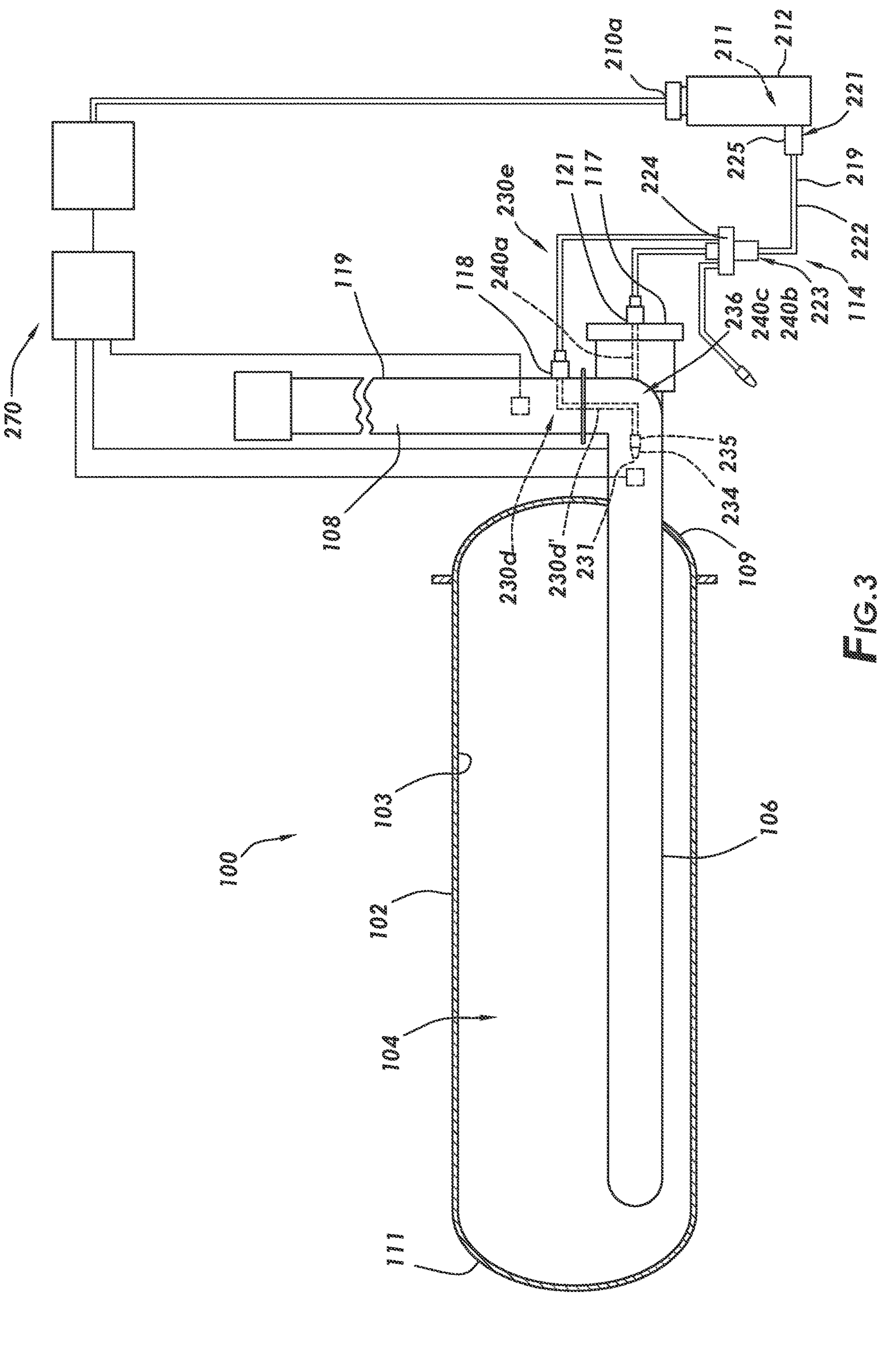
FIG. 3 is a stripped down schematic sideview of an oil, water and gas separator assembly connected to a fire extinguisher assembly; the combination intentionally omits the vertical gas separator and oil/water storage vessel for ease of understanding; the assemblies embodying features of the present invention.
Figure 4:
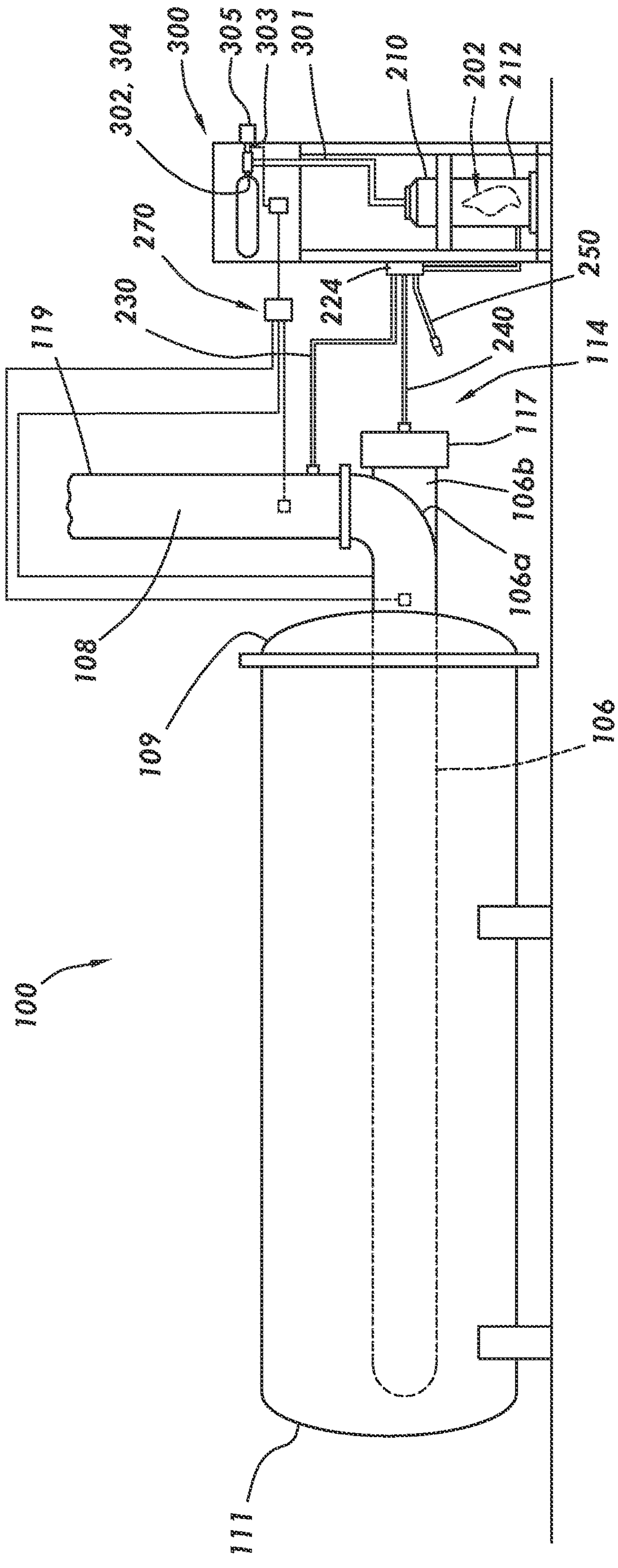
FIG. 4 is a stripped down schematic sideview of an oil, water and gas separator assembly connected to a fire extinguisher assembly the combination shows details of a compressed gas source of supply not shown in FIGS. 2 and 3; the combination intentionally omits the vertical gas separator and oil/water storage vessel for ease of understanding; the assemblies embodying features of the present invention.
Figure 5:
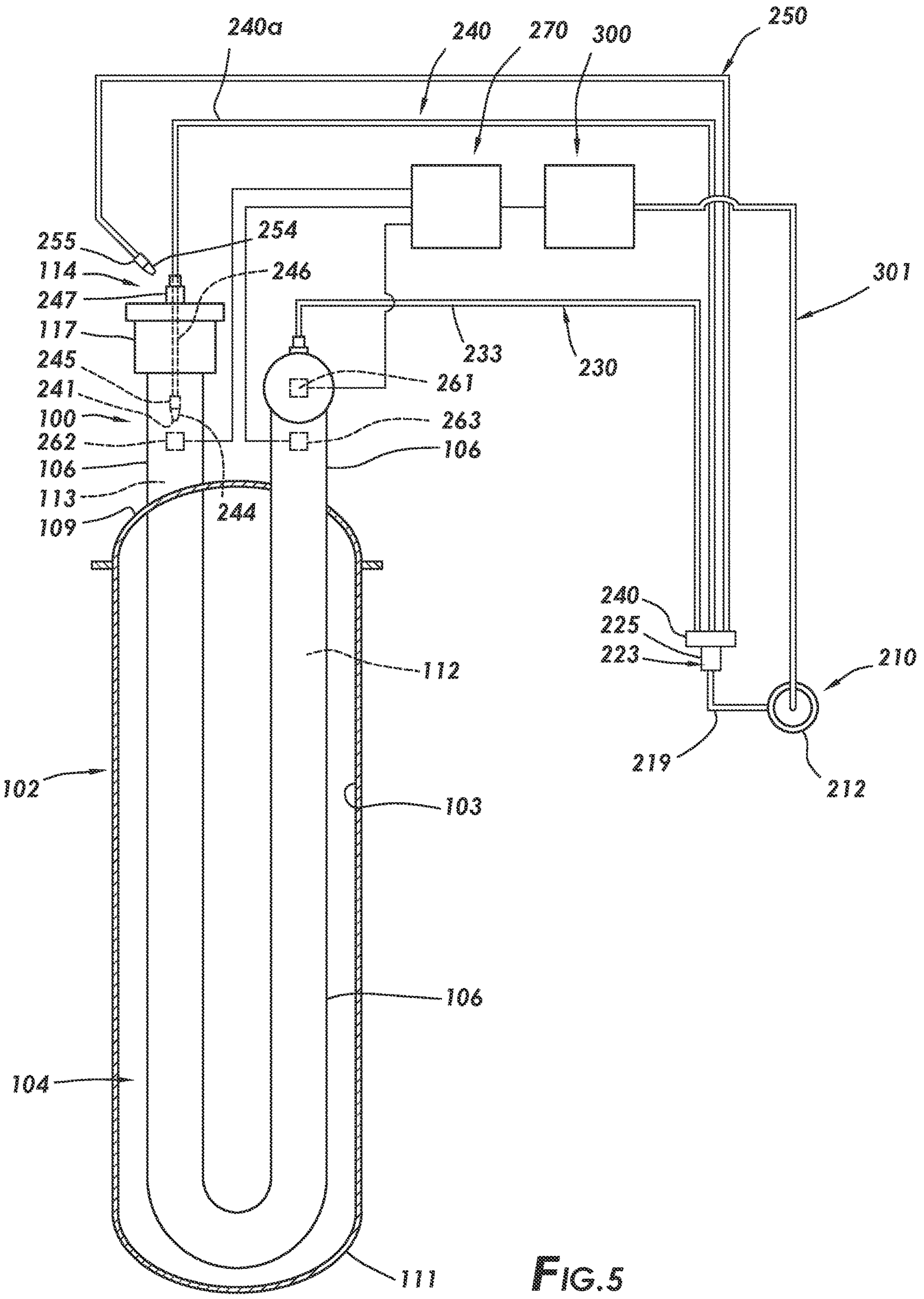
FIG. 5 is a stripped down schematic top view of an oil, water and gas separator assembly connected to a fire extinguisher assembly; the combination intentionally omits the vertical gas separator and oil/water storage vessel for ease of understanding; the assemblies embodying features of the present invention.
Figure 6:
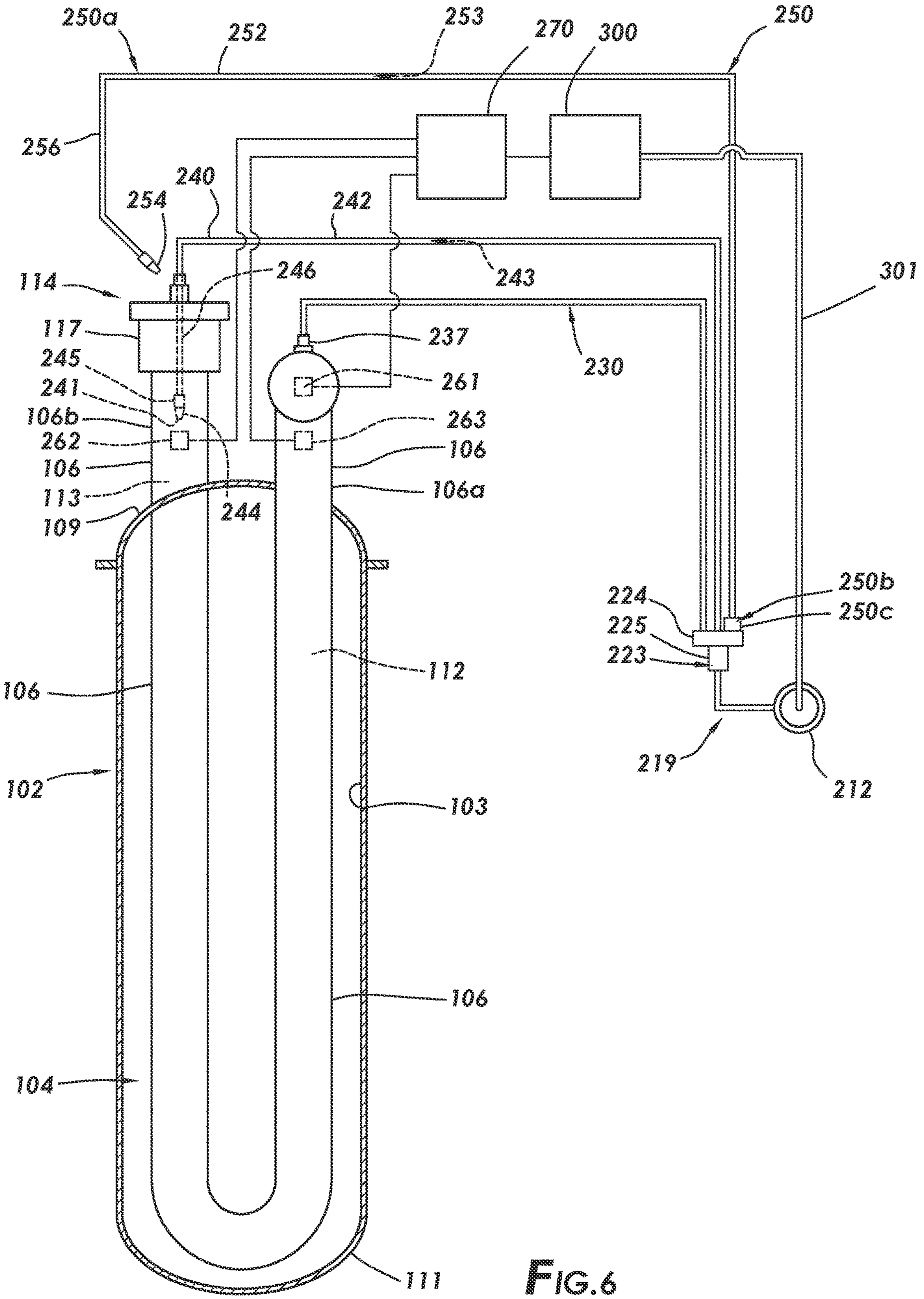
FIG. 6 is a stripped down schematic top view of an oil, water and gas separator assembly connected to a fire extinguisher assembly; the combination intentionally omits the vertical gas separator and oil/water storage vessel for ease of understanding; the assemblies embodying features of the present invention.
Figure 7:
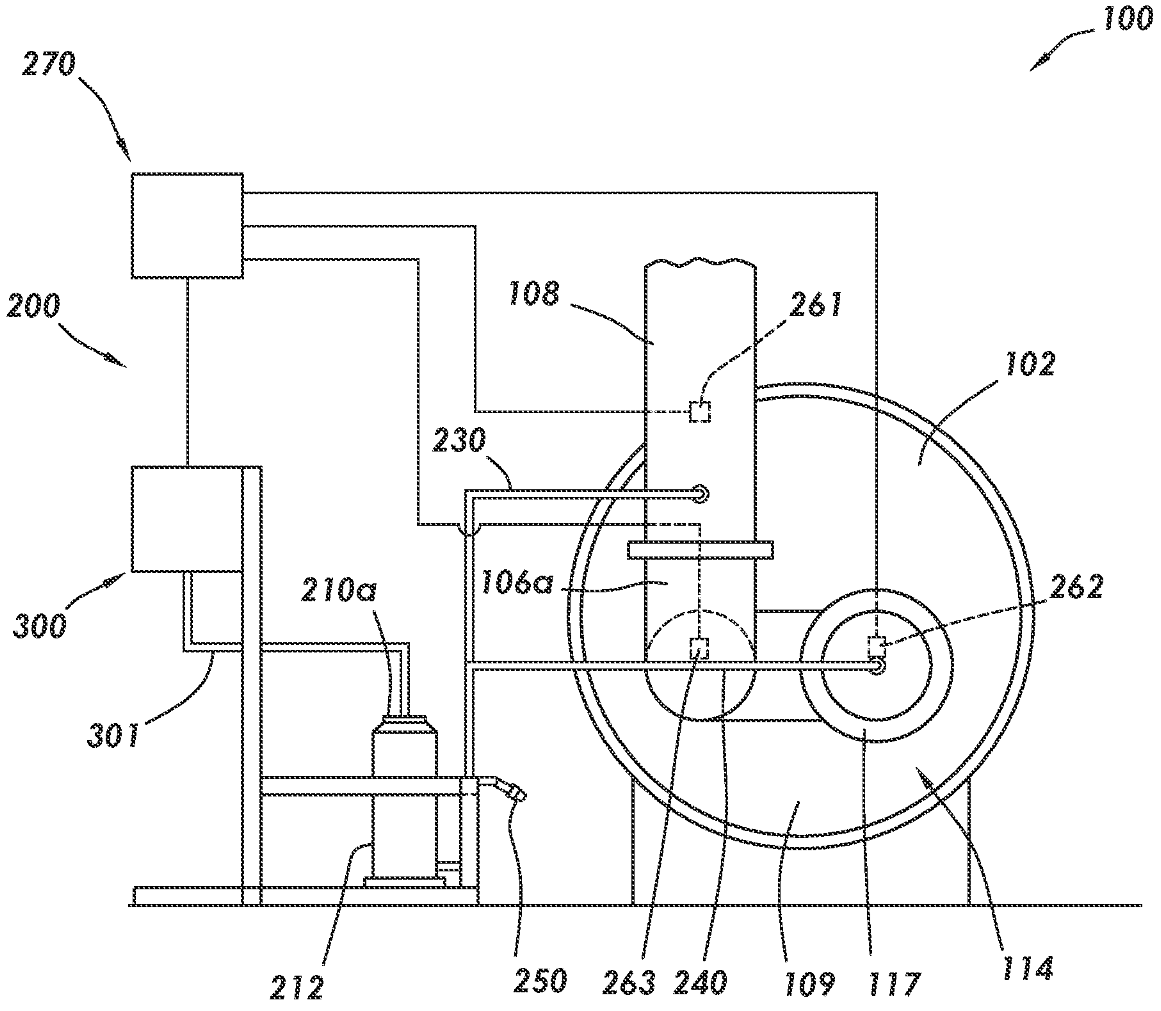
FIG. 7 is a stripped down schematic front view of an oil, water and gas separator assembly connected to a fire extinguisher assembly showing a vertical gas separator and a storage vessel for separated oil and water.
Figure 8:
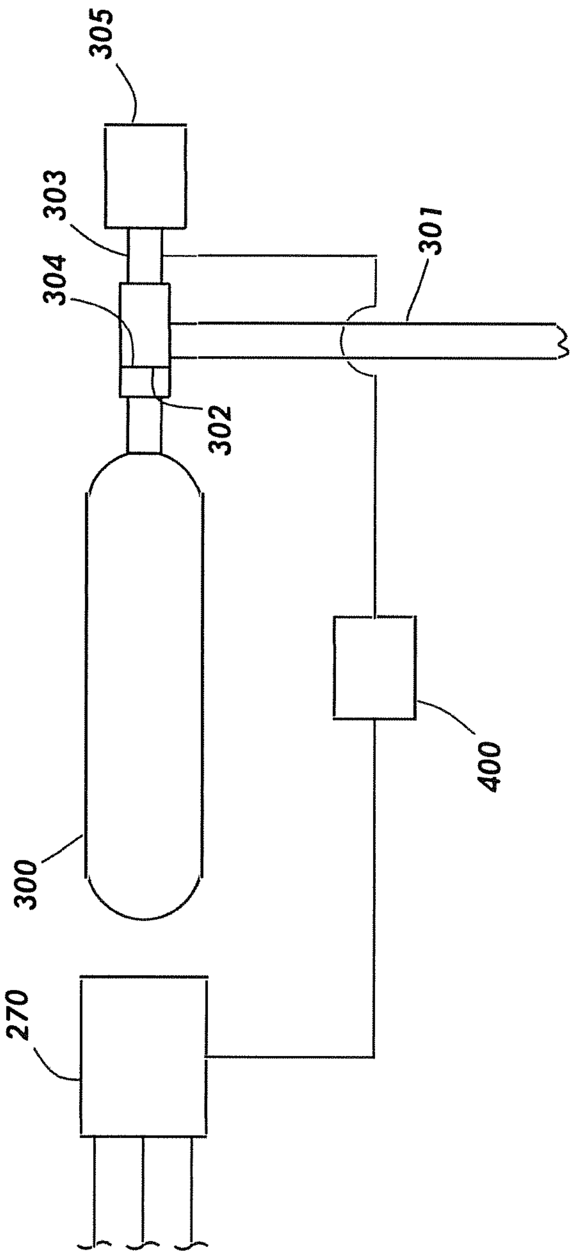
FIG. 8 is a blow up view of the compressed gas source of supply shown in FIG. 4.

FIGS. 1-7 disclose an oil, water, and gas separator assembly (100). The separator assembly includes a vessel (102) having an interior surface (103) delimiting a hollow (104). A firetube (106) is in the hollow (104). An exhaust stack (108) comes off the firetube and is external to the vessel (102). A fire extinguishing assembly (200) is connected to the separator assembly (100). The extinguishing assembly (200) includes a fire extinguishing agent source of supply (210). The assembly further includes a fire extinguishing agent distribution network (230, 240 250) disposed to receive fire extinguishing agent (202) through an inlet orifice (220) or orifices of the network (230, 240, 250) and disperse the agent (202) through a plurality of exhaust orifices (231, 241, 251) of the network. The exhaust orifices (231), and (241), are inside hollow areas (112, 113) delineated by the separator assembly (100). Exhaust orifice (251) is at an environment (114) external to the separator assembly. The external environment (114) proximate an end (109) of the separator vessel (102) and distal another end (111) of the vessel (102). The fire extinguishing assembly (200) further includes a plurality of sensors (261, 262, 263) to detect conditions associated with an unwanted fire condition in the separator assembly (100).

When the extinguisher assembly (200) is in operation, each sensor (261, 262, 263) can indicate an indication, such as a condition, to a processor system (270). If the indication, after processing by the processor system (270), indicates an unwanted fire condition, the processor actuates, with an indication, the movement of fire extinguishing agent or suppressant (202) from the source of supply (210), under pressure greater than atmospheric pressure, to and through the distribution network (230, 240, 250) and into the various hollows (112, 113) delimited by various surfaces of the separator assembly (100) and to the external environment (114). The fire extinguishing agent (202) in the hollows (112, 113) and at the external environment (114) terminates or suppresses the unwanted fire condition such as an unwanted fire in the firetube (106). In addition to actuating the movement of fire extinguishing agent (202), the indication causes the facility in which the separator operates to cease supplying production fluid to the separator. The indication also actuates an alert to advise persons of the fire condition. The term fire extinguishing agent (202) is broad enough herein to encompass fire extinguishing suppressant and vice versa.

In more detail the distribution network (230, 240, 250) of the fire extinguishing assembly (200) includes a first fire extinguishing agent supply line (230) disposed in fluid and fire extinguishing agent receiving relationship to the fire extinguishing agent source of supply (210). The first extinguishing agent supply line (230) of the fire extinguishing assembly (200) is connected, and more particularly fluidly connected, to the fire extinguishing agent source of supply (210). The first extinguishing agent supply line (230) of the fire extinguishing assembly fluidly (200) connects the fire extinguishing agent source of supply (210) to a first hollow area (112) delimited by an internal surface of said separator assembly. The supply line internal surface (232) delimits an internal open area (233). The internal open area (233) is in fluid connection with the source of supply. The fluid connection can be open or closed. The first extinguishing supply line (230) extends into the first hollow area (112) delimited by the internal surface of said separator assembly. The supply line in the hollow (112) includes the extinguishing agent exhaust orifice (231) in the hollow which opens out of a portion of the supply line into the first hollow area (112). The exhaust orifice (231) is an outlet. An internal surface of the firetube (106), at the exhaust side of the tube, delimits the first hollow (112). The first hollow area (112) is in fluid connection with a burner of the separator assembly (100). The burner is in the firetube (106).

The distribution network (230, 240, 250) of the fire extinguishing assembly can include a second fire extinguishing agent supply line (240) of the fire extinguishing assembly (200) disposed in fluid and fie extinguishing agent receiving relationship to the fire extinguishing agent source of supply (210). The second extinguishing agent supply line (240) of the fire extinguishing assembly (200) is connected and more particularly fluidly connected to the fire extinguishing agent source of supply (210). The second extinguishing agent supply line (240) of the fire extinguishing assembly fluidly connects the fire extinguishing agent source of supply (210) to a second hollow area (113) delimited by an internal surface of said separator assembly (100). The second supply line (240) has an internal surface (242) which delimits an internal open area (243). The internal open area (243) is in fluid connection with the source of supply (210). The fluid connection can be open or closed. The second extinguishing supply line (240) extends into the second hollow area (113) delimited by an internal surface of said separator assembly. The second supply line (240) in the second hollow (113) area includes an extinguishing agent exhaust orifice (241) which opens out of a portion of the second supply line into the hollow area (113). The exhaust orifice (241) is an outlet. An internal surface of the firetube (106) delimits the second hollow (113). The second hollow is also in fluid connection with the burner. The second hollow (113) is at the fresh air side of the firetube (106).

The distribution network of the fire extinguishing assembly (200) includes a third fire extinguishing agent supply line (250) of the fire extinguishing assembly disposed in fluid and fire extinguishing agent receiving relationship to the fire extinguishing agent source of supply (210). The third extinguishing agent supply line (250) of the fire extinguishing assembly is connected and more particularly fluidly connected to the fire extinguishing agent source of supply (210). The third extinguishing agent supply line (250) connects the fire extinguishing agent source of supply to the area external to the firetube (106) and an area (114) external to the vessel in which is the firetube. The area (114) resides in the environment external to the separator assembly. The area is proximate a flame arrestor (117) at a fresh air end of the firetube (106). The area (114) is distal an end (111) of the vessel (102) opposite the end (109) of the vessel (102) through which the firetube (106) extends. The third supply line (250) has an internal surface (252) which delimits an internal open area (253). The internal open area (253) is in fluid connection with the source of supply (210). The fluid connection can be open or closed. The third supply line (250) at the external area (114) includes an extinguishing agent exhaust orifice (251) which opens out of a portion of the supply line into the external area (114). The exhaust orifice (251) is an outlet.

In more detail each sensor (261, 262, 263) of the fire extinguishing assembly (200) is operatively coupled to the separator assembly (100). Each sensor (261, 262, 263) is signally coupled to the processor system (270). The processor system can comprise one or more CPU's. Each sensor (261, 262, 263) can be hardwired to the processor system (270). Each sensor can be part of one or more detector systems. Each detector system can be self-contained or self-contained except for its power source. Each detector can include a unitary carrier which carries a sensor and processing system. The detectors can be signally coupled to one another. One of the sensors (263) can be configured and disposed to detect unwanted liquid in the separator assembly (100). Another of the sensors (262) can be disposed and configured to detect unwanted heat in the separator assembly at the fresh air side of the firetube (106). A further of the sensors (261) can be configured and disposed to also detect unwanted heat in another area of separator assembly and more particularly at the exhaust side of the firetube. Each of the sensors can be configured and disposed to detect whether the unwanted condition exists in the firetube (106) and/or the internal hollow (104) delimited by the vessel external to the firetube. Each of the sensors can be disposed in the firetube (106) and/or the internal hollow (104) delimited by the vessel external to the firetube. In general, the system can deploy heat sensor (262) to indicate an indication when the heat at the flame arrestor exceeds 300 degrees Fahrenheit. The other heat sensor (261) can be deployed to indicate an indication when the heat at the exhaust exceeds 600 degrees Fahrenheit. Many other types of sensors such as flame and smoke can be deployed.

The processor system can be configured to indicate an indication, such as a condition, to actuate the movement of fire extinguishing agent (202) from the source of supply (210) through the supply lines (240, 250, 260) only if a specific one or combination of said plurality of indications by the sensors (261, 262, 263) indicate an unwanted condition. For instance, the processor indication can actuate movement of the agent (202) based on an indication from the liquid sensor (263) only if one of the heat sensors (261, 262) also has an indication of an excessive amount of heat. Also, an unwanted indication of heat by either sensor (261) or (262) indicates can cause the processor system (270) to actuate the movement of the agent (202) from the source of supply (210). The processor can actuate movement if any of a flame or smoke sensor's indications indicates an unwanted condition. The indications from the sensors and processing system can be the non-transmission of a signal, the transmission of a signal, and/or the change in a signal being transmitted.

In more detail, the fire extinguishing agent supply source (210) includes a containment (212) housing the fire extinguishing agent (202). The containment is a vessel (212) having an internal surface which delimits a hollow (211). Fire extinguishing agent (202) resides in the hollow. The containment can include a plurality of vessels each only fluidly connected to a single or discrete group of fire extinguishing agent supply lines. The vessels can also be fluidly connected to each other. The fire extinguishing agent (202) used and housed in the fire extinguishing vessel (210) can be in the form of a dry chemical powder rated for class ABC fire or BC fires, water, or water mist (not advised), firefighting foam solution suitable for class B fires, clean agents such as halon, oxygen displacing agents such as carbon dioxide, or other type of suppressing/extinguishing agent suitable for class B fires. Multiple agents and vessels, such as tanks, can be used in conjunction with one another so long as the supply source, distribution network, and nozzles are configured in a manner that will prevent any agent mixing that would interfere with or prohibit fire suppression/extinguishment.

In more detail each supply line (240, 250, 260) is disposed to receive fire extinguishing agent under pressure from the vessel (212). Each supply line (240, 250, 260) is connected and more particularly fluidly connected to the vessel (212). Each supply line has a common shared first section (219) shared with the other supply lines. The common shared first section (219) forms a common shared supply line delimiting a common shared channel and path. The common shared first section (219) has a common shared extinguishing agent receiving orifice (220). The shared orifice (220) forms the extinguishing agent receiving orifice (220) of each supply line. The orifice (220) is an inlet. A coupling (221) forms the common inlet (220) of the common first section (219) of each supply line. The coupling (221) connects a downstream common tube (222) of the common first section (219) of each supply line to the fire extinguishing agent source of supply (210). The coupling (221) connects to an outlet of the vessel (212). The common shared first section (219), channel, path, and line has a common outlet (223) coupled to a manifold (224). A coupling (225) forms the outlet. The outlet is in fluid connection with the manifold (224). The coupling (225) is open to the manifold when fire extinguishing agent moves through the outlet. Each supply line extends from its extinguishing agent receiving common orifice (220), at its first end, to its exhaust orifice (231, 241, 251) at its second end. Each supply line delimits a channel and path which extends from its common agent receiving orifice (220) to its exhaust orifice (231, 241, 251). Each exhaust orifice (231, 241, 251) is an outlet. The path along each supply line and each supply lines channel, starting from the common receiving agent orifice (220) to each extinguishing agent exhaust orifice (231, 241, 251) can be called a downstream direction.

Each supply line includes a second section (230*a*, 240*a*, 250*a*) separate from each other. Each supply line second section has its own unique orifice (230*b*, 240*b*, 250*b*) at the manifold (224). Each unique orifice is separate from each other. Each orifice (230*b*, 240*b*, 250*b*) forms an extinguishing agent inlet. A coupling (230*c*, 240*c*, 250*c*) forms each inlet. Each unique second section (230*a*, 240*a*, 250*a*) forms a unique supply line, channel and path separate from each other. Each second section (230*a*, 240*a*, 250*a*) is a branch disposed in fire extinguishing agent receiving relationship with the common section (219). Each second section (230*a*, 240*a*, 250*a*) extends downstream from its inlet (230*b*, 240*b*, 250*b*) to the line's exhaust orifice (231, 241, 251). A nozzle (234, 244, 254) of each second section (230*a*, 240*a*, 250*a*) forms its exhaust orifice (231, 241, 251). A coupling (235, 245, 255) of each second section couples its nozzle (234, 244, 254) to a tube (236, 247, 248) of each second section. In the present case the manifold (224) is a splitter box.

The second section (230*a*, 240*a*) of the first (230) and second (240) supply lines each have a first portion (230*d*); each first portion is in its respective hollow (112, 113). The second section first portion (230*d*) of each first and second supply line includes the tube (236, 246) connected to the nozzle (234, 244) all of which is in its respective hollow (112, 113). The coupling (235, 245) interconnects the nozzle (234, 244) to the tube (236, 246). The second section (230*a*, 240*a*) of each of the first (230) and second (240) supply lines includes a second portion (230*e*). Each second portion (230*e* is upstream of the line's first portion. Each second portion (230*e*) is external to the separator assembly (100).

A through opening (118) opens through an external and internal surface of the separator assembly. The through opening (118) can extend through the external and internal surface of an exhaust (119) external to said vessel. The exhaust (119) delimiting an internal exhaust hollow (120) is in fluid connection with said first hollow (112). An exhaust stack can form the exhaust (119). The exhaust (119) can couple to the firetube (106) at an exhaust end (106*a*) of the firetube (106). The second section (230*a*), first portion (230*d*) of the first supply line (230) is at an internal side of the through opening. It lies in the internal hollow (120) of the exhaust (119) and the first hollow (112). The second section (230*a*) second portion (230*e*) is at an external side of the opening (118). The second portion (230*e*) lies in the environment external to the separator assembly (100). A portion of the first supply line (230) second section (230*a*) can reside in the opening (118). The portion residing in the opening (118) can be continuous with the first (230*d*) and/or second (230*e*) portion. The portion residing in the opening (118) can be formed from a coupling (237). The coupling (237) can interconnect the first (230*d*) and second (230*e*) portions. The coupling (237) can be a bulkhead. A mounting plate can couple the bulkhead to the external surface of the exhaust stack (119).

A first segment (230*d*') of the first portion (230*d*) can extend away from the first supply line exhaust orifice (231), in the upstream direction of the first supply line (230), and in the first hollow (112) of the firetube (106). A second segment (230*d*") of the first portion (230*d*) can extend away from the through opening (118), in and through the exhaust stack hollow (120), downstream to the first segment (230*d*') in the first hollow (112). The first (230*d*) and second portion (230*e*) of the first section (230*a*) each includes a tube. Portions of each tube can be interconnected by couplings.

A second through opening (121) opens through an external and internal surface of the separator assembly. The through opening (121) can extend through the external and internal surface of a flame arrestor (117) external to said vessel (102). The flame arrestor (117) is in fluid connection with said second hollow (113). The flame arrestor (117) can couple to the firetube (106) at a fresh air intake portion (106*b*) of the firetube. The second section (240*a*), first portion of the second supply line (240) is at an internal side of the flame arrestor opening (121). The first portion in the hollow. The second section second portion is at an external side of the flame arrestor opening (121). The second portion (240) in the environment external to the separator assembly (100). A portion of the second supply line second section (240*a*) can reside in the opening. The portion residing in the opening can be continuous with the first and/or second portion. The portion residing in the opening (121) can be formed from a coupling (247). The coupling (247) can interconnect the first and second portions. The coupling can be a bulkhead. A mounting plate can couple the bulkhead to the external surface of the flame arrestor.

The first portion can extend away from the second supply line (240) exhaust orifice (241), in the upstream direction of the second supply line (240), and in the second hollow (113) of the firetube (106) to the bulkhead (247). The first portion and second portions each include a tube. Portions of each tube of the first and second portion can be interconnected by couplings.

The separator assembly includes a compressed gas source of supply (300) connected to the fire extinguishing agent source of supply (210) by a compressed gas supply line (301). The compressed gas source of supply (300) can include one or more gas cartridges. Each compressed gas cartridge or vessel is typically filled with nitrogen under high pressure, 1500 to 3000 psi, depending on the size of the overall system but can vary widely. Other inert or safe for fire suppression gases can be used. Oxygen and/or compressed air should not be used as that would accelerate fire behavior.

A barrier (302) which can have a variable form prevents the compressed gas in the compressed gas source of supply (300) from flowing into the fire extinguishing agent source of supply (210). When the barrier (302) is in an open condition, gas from the compressed gas source of supply (300) flows from the compressed gas source of supply to the fire extinguishing agent source of supply (210). The flow of gas moves the fire extinguishing agent (202) out of the fire extinguishing agent source of supply (210) through the fire extinguishing agent distribution network (230, 240, 250) and into and about the separator assembly (100). When the barrier (302) is in a closed orientation, the barrier prevents the compressed gas from flowing from the compressed gas source of supply (300) to the fire extinguishing agent source of supply (210) to move the fire extinguishing agent (202) out of the fire extinguishing agent source of supply (210) and through the fire extinguish agent distribution network (230, 240, 250) and into and about the separator assembly (100). The barrier (302) can be located along the fire extinguishing assembly (200) from and between an outlet of the compressed gas supply (300) to an inlet of the fire extinguishing agent containment. The barrier (302) could be at and between the fire extinguishing agent source of supply outlet (210*a*) to the common shared outlet (223) of the extinguishing agent supply lines. The barrier (302) could also be between the common shared outlet (223) of the supply lines and the inlet (230*b*, 240*b*, 250*b*) of each supply lines second section.

The processor indication which actuates the movement of fire extinguishing agent (202) from the source of supply (210), actuates the barrier (302) to open. More particularly the indication to open the barrier (302) actuates a breaker (303) to break the barrier. Alternatively, if the barrier (302)

is a valve, the indication can actuate the valve (304) to orient into an open position from a closed portion. The actuation of the breaker (303) or valve (304) can include the opening or closing of a circuit in electronic or signal connection with the processor. The closing and opening of the circuit can actuate movement of the breaker (303) or movement of a component of the valve (304). It can further include the transmission or cessation of a magnetic field. The transmission or cessation can actuate movement of the breaker (303) or movement of a component of the valve (304). The breaker (303) as opposed to being moved by an actuation induced by the indication from the processor (270) could be moved by a pusher (305). The breaker (303) movable by movement of the pusher (305) into breaking engagement with the barrier (302). The breaker (303) movable by movement of the pusher (305) can be a second breaker. Similarly, the valve (304) can be oriented from a closed position to an open position by manual movement of a manual actuator. In addition to actuating the movement of fire extinguishing agent (202), the manual movement of the actuator causes the facility in which the separator operates to cease supplying production fluid to the separator. The movement also actuates an alert to advise persons of the fire condition.

When the extinguisher assembly (200) is in operation, each sensor (261, 262, 263) indicates an indication, such as a condition, to the processor system (270). If the indications of the sensors (261, 262, 263) indicate an unwanted fire condition, after processing by the processor, the processor indicates an indication. The indication flows through an eclectic line to terminal (400). A signal form terminal four actuates the breaker. (303). Therefor the indication from processor (270) actuates the breaker (303) to break the barrier (302). The breaking of the barrier (302) opens the barrier (302). Compressed gas flows out of the compressed gas vessel (300) into and through the compressed gas supply line (301). The compressed gas moves into fluid contact with the fire extinguishing agent (202) in the extinguishing agent supply vessel (212). The compressed gas moves the fire extinguishing agent (202) in the supply vessel (212) into the common first section (219) of supply lines (230, 240, 250). From the common first section (219), the extinguishing agent (202) moves into the manifold (224). From the manifold (224), it moves into each second section (230*a*, 240*a*, 250*a*) of each supply line. The agent (202) in the second section (230*a*) of the first supply line (230) moves through the section's exhaust orifice (231) of its nozzle (234) and into the first hollow (112). The agent (202) in the second section (240*a*) of second supply line (240) moves through its exhaust orifice (241) of its nozzle (244) and into the second hollow (113). The agent (202) in the second section (250*a*) of the third supply line (250) moves through its exhaust orifice (251) of its nozzle (254) and into the area (114) in the external environment. The indication from the sensors can be a state of signal transmission or non-transmission or signal change from the sensors. The indication from the processor system can be a state of signal transmission or non-transmission or signal change from the sensors.

As can be easily understood from the foregoing, the basic concepts of the present invention may be embodied in a variety of ways. The invention involves numerous and varied embodiments of an oil, water, and gas separator in combination with a fire extinguishing agent assembly and methods for making and using such combination.

As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "first extinguishing agent supply line" should be understood to encompass disclosure of the act of "supplying fire extinguishing agent"—whether explicitly discussed or not—and, conversely, were there is a disclosure of the act of "breaking", such a disclosure should be understood to encompass disclosure of a "break" and even a "means for breaking". Such alternative terms for each element or step are to be understood to be explicitly included in the description.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled", "connected" or derivatives thereof can mean indirectly coupled or connected or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the combinations and extinguisher assemblies herein disclosed and described, ii) the related methods disclosed and described, iii) similar, equivalent, and even implicit variations of each of these constructions and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. An oil, water and gas separator assembly connected to a fire extinguishing assembly comprising:

a vessel having an interior surface delimiting an open area;

a firetube in said vessel open area;

a fire extinguishing agent source of supply, wherein said fire extinguishing agent source of supply comprises a containment, and wherein said fire extinguishing agent resides in said containment;

a first fire extinguishing agent supply line in fire extinguishing agent receiving relationship to said fire extinguishing agent source of supply; said first fire extinguishing agent supply line having a fire extinguishing agent exhaust orifice; said first fire extinguishing agent supply line connects to said containment;

a first hollow area delimited by said separator assembly; said first fire extinguishing agent supply line exhaust orifice disposed in said first hollow area delimited by said separator assembly;

a second fire extinguishing agent supply line connected to said containment; said second fire extinguishing agent supply line having a fire extinguishing agent exhaust orifice;

a second hollow area delimited by said separator assembly; said second fire extinguishing agent exhaust orifice disposed in said second hollow area delimited by said separator assembly;

a third fire extinguishing agent supply line connected to said containment; said third fire extinguishing agent supply line having a fire extinguishing agent exhaust orifice; and wherein, said third fire extinguishing agent exhaust orifice disposed in an environment external to said separator assembly, said environment proximate a first end of said vessel and distal a second end of said vessel;

a flame arrestor connected to said firetube; wherein, said flame arrestor resides proximate said first end of said vessel and distal said second end of said vessel;

a first sensor operatively coupled to said separator assembly, said sensor configured to indicate an indication;

a processor system operatively coupled to said first sensor and configured to process said indication from said first sensor; and wherein, when said indication, after processing by the processor system, indicates, alone or in companion with other indications, an unwanted fire condition, the processor system actuates the movement of fire extinguishing agent in said containment into said first fire extinguishing agent supply line and through said first fire extinguishing agent exhaust orifice; and into said second fire extinguishing agent supply line and through said second fire extinguishing agent exhaust orifice; and into said third fire extinguishing agent supply line and through said third fire extinguishing agent exhaust orifice.

2. The oil, water and gas separator assembly connected to the fire extinguishing assembly of claim 1, further comprising:

an internal surface of said firetube delimiting a hollow forming said first hollow area and said second hollow area.

3. The oil, water and gas separator assembly connected to the fire extinguishing assembly of claim 2, further comprising:

a delimited path which directs substance from a combusting gas in said firetube out of said separator assembly.

4. The oil, water and gas separator assembly connected to the fire extinguishing assembly of claim 3, wherein, said delimited path further directs ambient air to a gas outlet for said combusting.

5. The oil, water and gas separator assembly connected to the fire extinguishing assembly of claim 4, wherein said firetube further comprises:

a first portion exclusively in said open area of said vessel, said first portion delimiting said hollow delimited by said firetube;

a second portion external to said vessel delimiting said hollow delimited by said firetube;

a third portion external to said vessel delimiting said hollow delimited by said firetube; and wherein, said second and third portion reside proximate the first end and distal the second end of the vessel.

6. The oil, water and gas separator assembly connected to the fire extinguishing assembly of claim 5, wherein, said pathway formed with said hollow delimited by said firetube.

7. The oil, water and gas separator assembly connected to the fire extinguishing assembly of claim 6, wherein, a first point along said delimited pathway resides in said first portion of said firetube, said first point distal said second end and proximate said first end of said vessel;

a second point along said delimited pathway resides in said first portion of said firetube, said second point distal said first end and proximate said second end;

a third point along said pathway resides in said first portion of said firetube, said third point proximate said first end and distal said second end;

a fourth point along said pathway resides in said second portion of said firetube; and a fifth point lies along said pathway resides in said third portion of said firetube.

8. The oil, water and gas separator assembly connected to the fire extinguishing assembly of claim 7, wherein, a downstream exhaust direction extends from said first point to said second point and from said second point to said third point.

9. The oil, water and gas separator assembly connected to the fire extinguishing assembly of claim 8, wherein, said downstream exhaust direction further extends from said third point to said fourth point.

10. The oil, water and gas separator assembly connected to the fire extinguishing assembly of claim 9, wherein said first hollow area resides in said second portion.

11. The oil, water and gas separator assembly connected to the fire extinguishing assembly of claim 10, wherein said second hollow area resides in said third portion.

12. The oil, water and gas separator assembly connected to the fire extinguishing assembly of claim 11, further comprising: an exhaust, said exhaust downstream of said third point and in fluid connection with said first portion.

13. The oil, water and gas separator assembly connected to the fire extinguishing assembly of claim 12, wherein said exhaust formed with an exhaust stack.

14. The oil, water and gas separator assembly connected to the fire extinguishing assembly of claim 13, wherein, said first supply line extends into said exhaust stack;

said flame arrestor at said third portion; and said second supply line extends through said flame arrestor.

* * * * *